(12) United States Patent
Gaugler et al.

(10) Patent No.: US 10,615,400 B2
(45) Date of Patent: Apr. 7, 2020

(54) BATTERY WITH A SAFETY DEVICE WHICH CAN BE RESET, AND ALSO SUITABLE POLE STUD FOR THE BATTERY

(71) Applicant: VOLKSWAGEN VARTA Microbattery Forschungsgesellschaft mbH & Co. KG, Ellwangen Jagst (DE)

(72) Inventors: Andreas Gaugler, Ellwangen (DE); Konrad Holl, Aalen (DE); Stefan Stock, Rainau (DE); Werner Schreiber, Meine (DE)

(73) Assignees: VW Kraftwerk GmbH, Wolfsburg (DE); VARTA Microbattery GmbH, Ellwangen Jagst (DE)

( * ) Notice: Subject to any disclaimer, the term of this patent is extended or adjusted under 35 U.S.C. 154(b) by 680 days.

(21) Appl. No.: 14/786,199

(22) PCT Filed: Apr. 24, 2014

(86) PCT No.: PCT/EP2014/058314
§ 371 (c)(1),
(2) Date: Oct. 22, 2015

(87) PCT Pub. No.: WO2014/180665
PCT Pub. Date: Nov. 13, 2014

(65) Prior Publication Data
US 2016/0064723 A1    Mar. 3, 2016

(30) Foreign Application Priority Data

May 8, 2013 (DE) .................. 10 2013 208 555

(51) Int. Cl.
*H01M 2/30*    (2006.01)
*H01M 10/05*    (2010.01)
(Continued)

(52) U.S. Cl.
CPC ......... *H01M 2/345* (2013.01); *H01M 2/1229* (2013.01); *H01M 2/30* (2013.01);
(Continued)

(58) Field of Classification Search
CPC ...... H01M 2/345; H01M 2/1229; H01M 2/30; H01M 10/0525; H01M 10/48
See application file for complete search history.

(56) References Cited

U.S. PATENT DOCUMENTS

| 3,373,057 | A | 3/1968 | Jost et al. |
| 6,080,506 | A | 6/2000 | Davis et al. |

(Continued)

FOREIGN PATENT DOCUMENTS

| CN | 1568556 | 1/2005 |
| CN | 2916936 | 6/2007 |

(Continued)

OTHER PUBLICATIONS

First Office Action dated Nov. 30, 2016, of corresponding Chinese Application No. 201480025755.5, along with an English translation.

(Continued)

*Primary Examiner* — Ula C Ruddock
*Assistant Examiner* — Frank A Chernow
(74) *Attorney, Agent, or Firm* — DLA Piper LLP (US)

(57) ABSTRACT

A battery includes a housing, at least one individual cell arranged in the housing and including at least one positive electrode and at least one negative electrode, a positive pole stud passed through the housing and electrically connected to the at least one positive electrode and/or a negative pole stud passed through the housing and electrically connected to the at least one negative electrode, at least one electrical switch which can be pneumatically operated and changes its switching state in the event of an increase in pressure within (Continued)

the housing beyond a threshold value and thereby interrupts the electrical connection between at least one of the pole studs and an associated at least one electrode, and a resetting device with which an electrical connection which is interrupted as a result of a change in the switching state can be re-established without the housing having to be opened.

12 Claims, 2 Drawing Sheets

(51) Int. Cl.
    *H01M 2/34* (2006.01)
    *H01M 2/12* (2006.01)
    *H01M 10/0525* (2010.01)
    *H01M 10/48* (2006.01)

(52) U.S. Cl.
    CPC ....... *H01M 10/0525* (2013.01); *H01M 10/48* (2013.01); *H01M 2200/20* (2013.01); *H01M 2220/20* (2013.01); *H01M 2220/30* (2013.01)

(56) References Cited

U.S. PATENT DOCUMENTS

| | | | |
|---|---|---|---|
| 6,143,440 | A | 11/2000 | Volz et al. |
| 6,570,364 | B2 | 5/2003 | Haid et al. |
| 7,713,651 | B2 | 5/2010 | Leysieffer et al. |
| 2001/0031391 | A1* | 10/2001 | Hironaka ................ H01M 2/06 429/94 |
| 2002/0098410 | A1* | 7/2002 | Leysieffer ........... H01M 2/0207 429/61 |
| 2002/0119364 | A1 | 8/2002 | Bushong et al. |
| 2005/0191542 | A1 | 9/2005 | Bushong et al. |
| 2007/0275298 | A1 | 11/2007 | Igoris et al. |
| 2011/0086253 | A1 | 4/2011 | Pompetzki et al. |

FOREIGN PATENT DOCUMENTS

| | | |
|---|---|---|
| CN | 101490874 | 7/2009 |
| CN | 202094245 | 12/2011 |
| DE | 100 47 206 A1 | 6/2002 |
| DE | 101 04 981 A1 | 8/2002 |
| DE | 10 2007 020 905 A1 | 11/2008 |
| DE | 10 2008 020 912 A1 | 10/2009 |
| EP | 0 739 047 A2 | 10/1996 |
| EP | 0 981 173 A1 | 2/2000 |
| EP | 1 073 132 A1 | 1/2001 |
| JP | 56-019872 A | 2/1981 |
| JP | 2002-124236 | 4/2002 |
| JP | 2007-149433 | 6/2007 |
| JP | 2013-101889 | 5/2013 |

OTHER PUBLICATIONS

Third Office Action dated Dec. 12, 2017, of corresponding Chinse Application No. 201480025755.5, along with an English translation.

European Official Action dated Aug. 15, 2018, from counterpart European Patent Application No. 14 719 013.6.

* cited by examiner

BATTERY WITH A SAFETY DEVICE WHICH CAN BE RESET, AND ALSO SUITABLE POLE STUD FOR THE BATTERY

TECHNICAL FIELD

This disclosure relates to a battery having a housing in which at least one individual cell with at least one positive electrode and at least one negative electrode is arranged. A pole stud electrically connected to the at least one positive electrode or to the at least one negative electrode is passed through the housing. The battery has an electrical switch which can be pneumatically operated and changes its switching state in the event of an increase in pressure within the housing beyond a threshold value and, in the process, interrupts the electrical connection between at least one of the pole studs and the associated at least one electrode. The disclosure also relates to a pole stud suitable for a battery of this kind.

BACKGROUND

The term "battery" originally meant a plurality of electrochemical cells connected in series. Nowadays however, individual electrochemical cells (individual cells) are often called batteries. When an electrochemical cell is discharged, a chemical reaction which provides energy takes place, the reaction being made up of two partial reactions which are electrically coupled to one another but are physically separate from one another. Electrons are liberated at the negative electrode in an oxidation process, this resulting in a flow of electrons across an external load to the positive electrode which takes up a corresponding quantity of electrons. Therefore, a reduction process takes place at the positive electrode. At the same time, an ion current which corresponds to the electrode reaction occurs within the cell. This ion current is ensured by an electrolyte which conducts ions. The discharging reaction is reversible in secondary cells and batteries, that is to say it is possible to reverse the conversion of chemical energy into electrical energy which took place during discharging.

From amongst the known secondary cells, comparatively high energy densities are achieved, in particular by lithium-ion cells, that is to say by cells in which lithium ions migrate from one electrode to the other during charging and discharging processes. Cells of this kind are particularly suitable for use in portable devices such as mobile telephones and notebooks. However, they are also of particular interest as energy sources for motor vehicles.

Cells of lithium-ion batteries generally have combustible components. For example, the electrolyte of a lithium-ion cell often comprises an organic solvent such as ethylene carbonate, for example, as the main component. In conjunction with high energy densities of cells of this kind, this constitutes a potential hazard which should not be underestimated. It is therefore necessary to take particular safety precautions to be able to preclude risks for users or at least to keep the risks as slight as possible.

Lithium-ion cells may enter a critical state in which there is a risk of fire under certain circumstances, particularly when they are mechanically damaged or as a result of being excessively charged. Excessive charging of a lithium-ion cell can lead to deposition of metallic lithium on the surface of the negative electrode and also possibly to destruction of the electrolyte contained in the cell. The latter may lead to severe gassing of the cell. In extreme cases, this leads to damage to a housing surrounding the cell. As a result, moisture and oxygen can enter the cell and this can result in explosive combustion.

To avoid this, it is usual to provide lithium-ion cells with safety devices. A suitable circuit arrangement to electronically monitor the operational safety of rechargeable lithium-ion cells is known, for example, from DE 101 04 981 A1. The use of fuses to increase the safety of lithium-ion batteries is known from DE 10 2008 020 912 A1. DE 10 2007 020 905 A1 discloses cells having a discharge conductor arranged on a thin plastic film and having a predetermined breaking point. If the film deforms, for example, as a result of cell gassing, the discharge conductor is destroyed at the predetermined breaking point, as a result of which the cell is irreversibly and permanently deactivated.

Both fuses and safety means in which an electrical contact is destroyed or interrupted are known to be very reliable. However, one problem is that the battery initially remains in a critical, possibly also dangerous, state after safety devices of this kind are tripped. Furthermore, since the safety devices are irreversibly tripped, it is generally not possible to actively change something in this state.

It could therefore be helpful to provide batteries, in particular lithium-ion batteries, in which a reliable and simple safety solution which takes the cited problems into account is realized.

SUMMARY

We provide a battery including a housing, at least one individual cell arranged in the housing and including at least one positive electrode and at least one negative electrode, a positive pole stud passed through the housing and electrically connected to the at least one positive electrode and/or a negative pole stud passed through the housing and electrically connected to the at least one negative electrode, at least one electrical switch which can be pneumatically operated and changes its switching state in the event of an increase in pressure within the housing beyond a threshold value and thereby interrupts the electrical connection between at least one of the pole studs and an associated at least one electrode, and a resetting device with which an electrical connection which is interrupted as a result of a change in the switching state can be re-established without the housing having to be opened.

We also provide a pole stud for the battery including a housing, at least one individual cell arranged in the housing and including at least one positive electrode and at least one negative electrode, a positive pole stud passed through the housing and electrically connected to the at least one positive electrode and/or a negative pole stud passed through the housing and electrically connected to the at least one negative electrode, at least one electrical switch which can be pneumatically operated and changes its switching state in the event of an increase in pressure within the housing beyond a threshold value and thereby interrupts the electrical connection between at least one of the pole studs and an associated at least one electrode, and a resetting device with which an electrical connection which is interrupted as a result of a change in the switching state can be re-established without the housing having to be opened, and including a head with two opposite flat sides and a hollow space, a shaft extending out of one of the flat sides and having a free shaft end, a gas-impermeable diaphragm which delimits the hollow space, and a passage bore through the shaft, which passage bore extends into the hollow space.

DETAILED DESCRIPTION

Figure 1A:
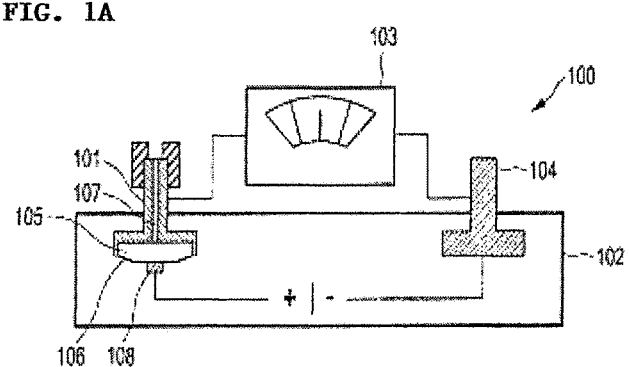
FIGS. 1A-1C schematically show three states of operating/switching of an example of a battery.

Like the batteries of the generic type, our batteries also have a housing in which at least one individual cell with at least one positive electrode and at least one negative electrode is arranged. The individual cell is preferably a lithium-ion-based cell. Accordingly, the battery is preferably a lithium-ion battery. Fields of application for the battery can be found, in particular, in the motor vehicle sector. The battery is accordingly preferably a motor vehicle battery.

The individual cell is preferably present in the form of a composite comprising electrode and separator foils in the sequence positive electrode/separator/negative electrode. In this case, the electrodes preferably comprise metal current collectors usually present in the form of two- or three-dimensional sheet-like structures. In lithium-ion batteries, a network or a foil composed of aluminum, for example, of extruded aluminum or a perforated aluminum foil, is preferably located approximately on the positive electrode side. Networks or foils composed of copper are usually used on the negative electrode side as current collectors. In principle, the battery can contain both a cell stack comprising a plurality of flat individual cells and also a wound individual cell (coil).

The housing shields the at least one individual cell from the area surrounding it and is preferably gas- and liquid-tight.

Fixed constituent parts of a battery are generally a positive and a negative pole stud which each project through the housing of the battery into the housing interior. In this case, the battery has both a positive and a negative pole stud. However, it is also possible for the housing itself to serve as a positive or negative pole. The housing has to be electrically conductive for this purpose. However, the housing is preferably composed of metal, in particular of aluminum or of an aluminum alloy. In this case, the battery can also have only a positive pole stud or only a negative pole stud.

The positive pole stud, in particular that part of the positive pole stud arranged within the housing, is possibly electrically connected to the at least one positive electrode. The negative pole stud, in particular that part of the positive pole stud arranged within the housing, is possibly connected to the at least one negative electrode. The pole studs are generally electrically and mechanically separated from the housing by an insulating compound as described in DE 100 47 206 A1, for example. If both poles are insulated in this way, the housing itself is free of potential.

Preferred examples of the pole studs will be described in further detail below. However, to begin with, it should be mentioned that it is particularly preferred for the pole studs or at least one of the pole studs to have a thread on its outside. Pole studs formed in this way can be passed through a bore or an alternative passage through a wall of the housing of the battery and fixed in the bore or in the passage, for example, by a nut screwed onto the thread.

The battery comprises at least one electrical switch which can be pneumatically operated and changes its switching state in the event of an increase in pressure within the housing, starting from an initial value, beyond a threshold value and, in the process, interrupts the electrical connection between at least one of the pole studs and the associated at least one electrode. Therefore, use is also made of the gassing of a cell, which gassing occurs in the event of excessive charging, for example. The produced gases serve as a "working medium" and can exert pressure on the pneumatically operable electrical switch until a change in the switching state takes place. Specific explanations for the pneumatically operable electrical switch follow.

The battery is particularly distinguished in that it comprises a resetting device with which an electrical connection which is interrupted as a result of a change in the switching state can be re-established, without the housing having to be opened for this purpose.

In other words, the pneumatically operable electrical switch has a first switching state in which there is an electrical connection between one of the pole studs and the associated at least one electrode and also has a second switching state in which the electrical connection is interrupted. The resetting device has to be designed and/or arranged such that it can return the switch from the second switching state to the first switching state in which the interrupted electrical connection is re-established without the housing being opened as stated. According to this measure, it is possible, for example, to discharge, in a controlled manner, a battery in a critical state after the pneumatically operable electrical switch is tripped.

The at least one pneumatically operable electrical switch preferably comprises two electrical contact elements physically separated from one another. One of the contact elements preferably connects to the at least one positive electrode or to the at least one negative electrode, and the other contact element preferably connects to the pole stud which respectively corresponds in terms of polarity. Particularly preferably, at least one of the contact elements can also be part of the pole stud or be the pole stud itself. Furthermore, the switch comprises an electrically conductive connecting element which, in a first state (that state which corresponds to the first switching state), connects the two contact elements and, owing to the increase in pressure, can be moved to a second state (corresponding to the second switching state) in which the contact to at least one of the contact elements is interrupted.

The connecting element is preferably a so-called "bistable" connecting element. A stable connecting element means a connecting element which can assume two possible stable states (in this case the first state and the second state). Switching over from the first state to the second state is possible only by a first external pulse, for example, the increase in pressure within the housing. After the switchover, the connecting element remains in the second state even when the first pulse is no longer acting on the connecting element. A return to the first state takes place only when the connecting element is subject to a second external pulse which differs from the first external pulse, for example, a drop in pressure to below the initial value.

The connecting element is particularly preferably a gas-impermeable diaphragm, in particular a bistable gas-impermeable diaphragm. If pressure is applied to one side of a diaphragm of this kind, the diaphragm bends in the direction of the side to which pressure is not applied. Given a corresponding arrangement of the electrical contact elements, the shaping which takes place in the process can lead to interruption of the electrical connection between the electrical contact elements.

In a bistable diaphragm, the diaphragm is moved due to the pressure from a first stable state, for example, a convex (or concave) arrangement to a second stable state, for example, a concave (or convex) arrangement in which it remains even when application of pressure ceases and the initial pressure is re-established.

The at least one pole stud particularly preferably has a hollow space partially delimited by the connecting element. The connecting element is therefore a constituent part of the pole stud. In particular, the pneumatically operable electrical switch is at least partially integrated into the pole stud when, at the same time, one of the contact elements is also part of the pole stud or is the pole stud itself. In other words, the pole stud contains at least part (apart from the second contact element) of the pneumatically operable electrical switch.

The hollow space is particularly preferably arranged in that part of the pole stud arranged within the housing so that the connecting element delimits the hollow space from the interior of the housing of the battery.

If the connecting element is a diaphragm, in particular a bistable diaphragm, it is preferred for the diaphragm to convexly bend into the interior in the above-defined first state (or the first switching state) and to change over to a concave configuration during the transition to the above-defined second state (or the second switching state), which transition is the result of the increase in pressure within the housing. To ensure that the intended interruption in the electrical connection between the at least one pole stud and the associated at least one electrode takes place in this case, one of the contact elements is preferably arranged such that it is only in contact with the diaphragm when the diaphragm is in the first state (convex).

The pole stud particularly preferably has a bore as part of the resetting device, the bore connecting the hollow space and the diaphragm to the outside of the housing. The bore moves the connecting element, in particular the diaphragm, from the second state to the first state.

The resetting device is preferably either a fluid-operated (that is to say a pneumatic or hydraulic) resetting device or a mechanical resetting device. In the first case, the bore and/or the hollow space are/is filled with a liquid or a gas as the working medium. The return to the first state is effected by applying pressure to the working medium, this being readily possible from the outside of the housing. In the second case, it is preferred for the resetting device to comprise a pin mounted in the bore and by which the connecting element can be moved from the second state to the first state. In this way, the described bistable diaphragm, for example, can be pushed by a pin of this kind from a concave configuration which is assumed as a result of an increase in pressure to the original convex configuration.

One end of the pin is particularly preferably fixed to the connecting element, in particular to the diaphragm.

The battery particularly preferably comprises an indicator that indicates the electrical connection which is interrupted as a result of a change in the switching state. Particularly preferably, the pin serves as the indicator. The pin can have, for example, a colored tip pushed out of the bore as a result of the increase in pressure in the interior of the battery.

The pole stud is preferably a constituent part of the described battery, but can also be sold separately. The pole stud can be subdivided into the following sections:
- a head with two opposite flat sides, wherein the head is preferably in the form of a disk or plate and/or the flat sides are preferably arranged parallel to one another, and
- a shaft extending out of one of the flat sides and has a free shaft end, wherein the shaft is preferably cylindrical and/or extends in a perpendicular manner from the flat side.

Therefore, the head and the shaft together form the main body of the pole stud. The head and shaft are preferably produced from metal, in particular from steel, wherein other conductive metals can of course also be used as base materials.

The head and the shaft are preferably produced in one piece, that is to say are constituent parts of one and the same part. Or, in other words, the main body is integrally formed and the head and the shaft form subregions of the main body.

The pole stud is characterized by a hollow space within the head, a gas-impermeable diaphragm delimiting the hollow space, and also a passage bore through the shaft, which passage bore issues into the hollow space, preferably starting from the free shaft end. In this case, it is preferred for the diaphragm to delimit the hollow space on that flat side which is averted from the shaft. It is further preferred for the passage bore to axially run through the shaft.

The hollow space is preferably exclusively accessible via the passage bore and otherwise sealed off in a gas-tight manner.

The diaphragm is particularly preferably a bistable gas-impermeable diaphragm. The diaphragm can assume two stable states (a convex arrangement and a concave arrangement) and, by application of pressure, can be moved from one state to the other state in which it remains even when the application of pressure ceases and the initial pressure is re-established.

As explained above, a bistable diaphragm can serve as a connecting element of a pneumatically operable electrical switch, wherein one of the stable states corresponds to a first switching position and the other stable state corresponds to a second switching position. The pole stud with the bistable gas-impermeable diaphragm can accordingly be part of a switch of this kind. The main body comprising the head and the shaft serves as one of the two abovementioned electrical contact elements of the switch in this case.

Preferably, the pole stud can also comprise the second of the electrical contact elements of the switch. In these examples, the pole stud can itself function as a pneumatically operable electrical switch. In other words, we also provide a pneumatically operable electrical switch in the form of a pole stud. To this end, the pole stud can have, for example, a cap placed over the head of the pole stud and which forms the second electrical contact element or into which the second contact element is integrated. The cap is particularly preferably in the form of a cup or bowl and is composed of an electrically non-conductive material, wherein it has a base into which the second contact element is integrated.

The pole stud preferably comprises a pin mounted in the bore and sits directly on the diaphragm. The pin can serve as the resetting means to push the diaphragm from a concave configuration, which is assumed as a result of an increase in pressure, to the original convex configuration.

Further preferably, the pole stud comprises a thread on the outside of the shaft.

When the pole stud is a constituent part of an above-described battery, in particular when it is passed through a bore or an alternative passage through a wall of the housing of the battery, as is mentioned above, the head is preferably arranged within the housing while at least part of the shaft, in particular that part of the shaft provided with the thread, is arranged outside the housing. As has likewise already been mentioned, a nut can be screwed onto the thread to fix the pole stud.

Further features and advantages can be found in the following description of the drawings. It should be noted at this point that all of the optional aspects of the method described herein can be implemented first on their own, but, second, also in combination with one or more further features. The preferred examples described below serve only for explanation and better understanding and are not to be understood to be limiting in any way.

FIG. 1 schematically shows the tripping of the pneumatically operable electrical switch of a preferred example of a battery 100 and resetting of the switch by a resetting device. FIG. 1a shows the situation before an increase in pressure. The positive pole stud 101 is passed through the housing 102 and electrically connects to the negative pole stud 104 via the potentiometer 103. A current flows between the two pole studs. The figure shows the hollow space 105 arranged within the pole stud 101 and is delimited from the interior of the housing 102 by the metal, gas-impermeable diaphragm 106. The hollow space 105 connects to the outside of the housing 102 by the bore 107. The diaphragm 106 bears against the electrical contact 108 which is coupled to the positive electrode of a lithium-ion cell arranged within the housing 102.

Figure 1B:
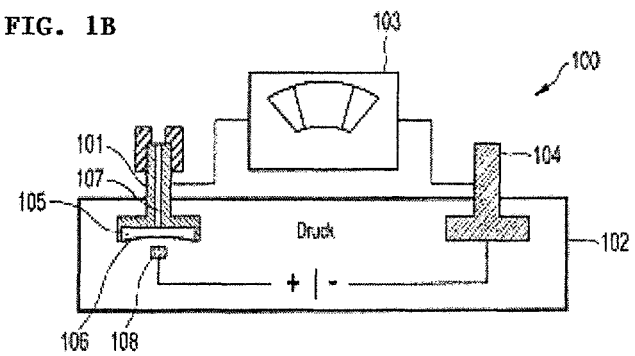
Figure 1C:
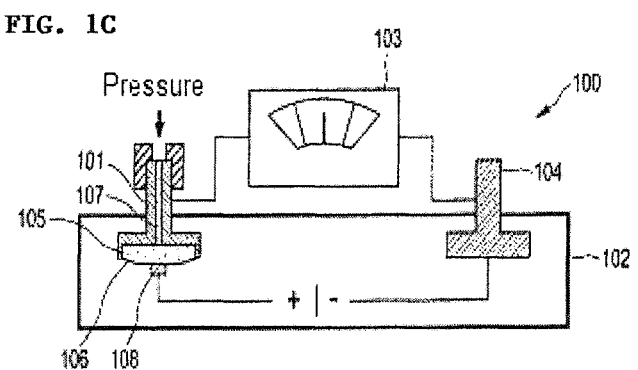

FIG. 1b shows the situation after an increase in pressure within the housing 102. The diaphragm 106 has bent into the hollow space due to the increase in pressure. The electrical contact to the positive electrode within the housing is interrupted. Accordingly, the voltage which is indicated by the potentiometer is also zero.

If, in a next step (FIG. 1c), pressure is applied from the outside to a working medium, for example, air which is situated in the hollow space 105 and in the bore 107, the diaphragm 106 can be pushed back out of the hollow space 105 until it again bears against the contact 108. It is accordingly possible to discharge the illustrated battery 100 in a controlled manner as a result.

Figure 2A:
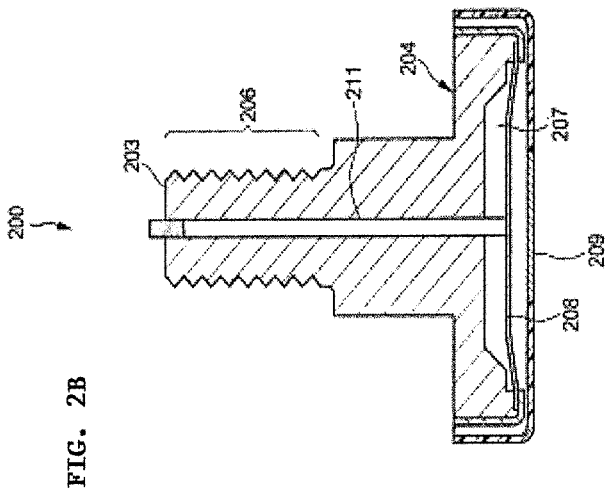
FIGS. 2A and 2B show schematic cross sections of an example of a pole stud in tripped and not tripped states.
Figure 2B:
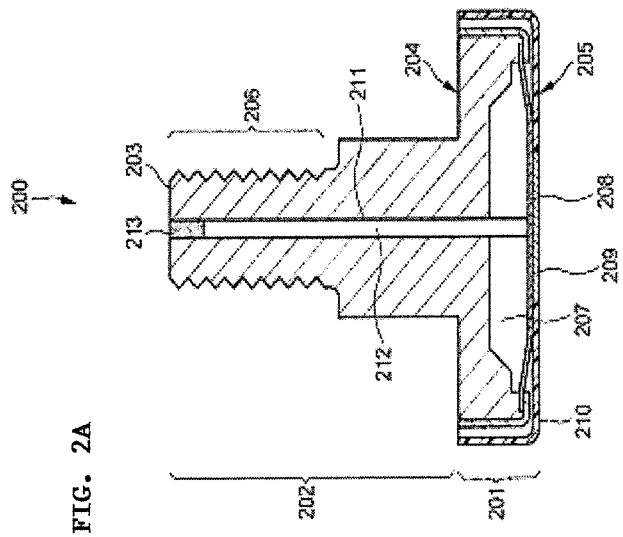

FIGS. 2A and 2B show a preferred example of a steel pole stud 200. The pole stud can be subdivided into a disk-like head 201 and a shaft 202 with a free shaft end 203. The head 201 has two opposite flat sides, the top side 204 and the bottom side 205. The shaft 202 extends out of the center of the flat side 204 in a perpendicular manner and is preferably cylindrical. The shaft may also taper conically in the direction of its free end 203 if desired. If required, the thread 206 is milled into a subsection of the shaft. When used as intended, the shaft 202 is passed from the inside to the outside through an aperture in a battery housing, which aperture is intended for this purpose, and possibly locked on the outside of the battery housing with a suitable nut.

A hollow space 207 which is likewise in the form of a disk and is delimited by a metal, gas-impermeable diaphragm 208 from the outside on that flat side 205 which is averted from the shaft 202 is situated within the head 201. One side of the diaphragm is in direct contact with the metal contact element 209 which is integrated into the base of the otherwise electrically non-conductive, cup- or bowl-like cap 210 which is placed over the head 201 and substantially completely covers the head, apart from the flat side 204. On the other side, the diaphragm 204 is electrically coupled to the main body of the pole stud 200. In the event of an increase in pressure on that side of the diaphragm 204 which is averted from the hollow space 207, the diaphragm 204 can bend into the hollow space 207. This results in contact between the diaphragm 204 and the contact element 208 being broken.

An axial bore 211 which, at the free end 203 of the shaft 202, enters the shaft and issues into the hollow space 207 is situated within the shaft 202. A pin 212 is mounted in the axial bore 210, one end of the pin projecting into the hollow space 207 and there sitting directly on the diaphragm 204. The other end is provided with a colored marking 213. If the diaphragm 204 bends into the hollow space 207, the colored end 213 of the pin 212 is pushed out of the bore 211 and indicates that the pneumatically operable switch integrated in the pole stud 200 has been tripped. If the pin 212 is pushed back into the bore 211, the diaphragm 204 will be pushed back out of the hollow space 207 so that direct contact with the contact element 208 is re-established.

The invention claimed is:

1. A battery comprising:
a housing;
at least one individual cell arranged in the housing and comprising at least one positive electrode and at least one negative electrode;
a positive pole stud passed through the housing and electrically connected to the at least one positive electrode and/or a negative pole stud passed through the housing and electrically connected to the at least one negative electrode;
at least one electrical switch which can be pneumatically operated and changes its switching state in the event of an increase in pressure within the housing beyond a threshold value and thereby interrupts the electrical connection between at least one of the pole studs and an associated at least one electrode; and
a resetting device with which an electrical connection which is interrupted as a result of a change in the switching state can be re-established without the housing having to be opened,
wherein the pole stud has a hollow space partially delimited by a gas-impermeable diaphragm, and the pole stud has a bore connecting the hollow space and the diaphragm to outside of the housing.

2. The battery as claimed in claim 1, wherein the at least one switch comprises two electrical contact elements physically separated from one another and an electrically conductive bistable connecting element which, in a first state, connects the two contact elements and, due to an increase in pressure, can be moved to a second state in which the contact to at least one of the contact elements is interrupted.

3. The battery as claimed in claim 1, wherein the resetting device is a fluid-operated resetting device or a mechanical resetting device.

4. The battery as claimed in claim 1, wherein the resetting device comprises a pin mounted in the bore and by which the connecting element can be moved from the second state to the first state.

5. The battery as claimed in claim 1, further comprising an indicator that indicates the electrical connection which is interrupted as a result of a change in the switching state.

6. The battery as claimed in claim 5, wherein the pin with which the connecting element can be moved from the second state to the first state via the bore functions as an indicator or controls an indicator.

7. A pole stud for the battery as claimed in claim 1, comprising:
a head with two opposite flat sides and a hollow space;
a shaft extending out of one of the flat sides and having a free shaft end;

a gas-impermeable diaphragm which delimits the hollow space; and a passage bore through the shaft, which passage bore extends into the hollow space.

8. The pole stud as claimed in claim 7, further comprising a pin mounted in the bore and which sits directly on the diaphragm.

9. The pole stud as claimed in claim 7, further comprising a thread on the outside of the shaft.

10. The pole stud as claimed in claim 8, further comprising a thread on the outside of the shaft.

11. The battery as claimed in claim 3, wherein the resetting device comprises a pin mounted in the bore and by which the connecting element can be moved from the second state to the first state.

12. The battery as claimed in claim 2, wherein the resetting device is a fluid-operated resetting device or a mechanical resetting device.

* * * * *